UNITED STATES PATENT OFFICE.

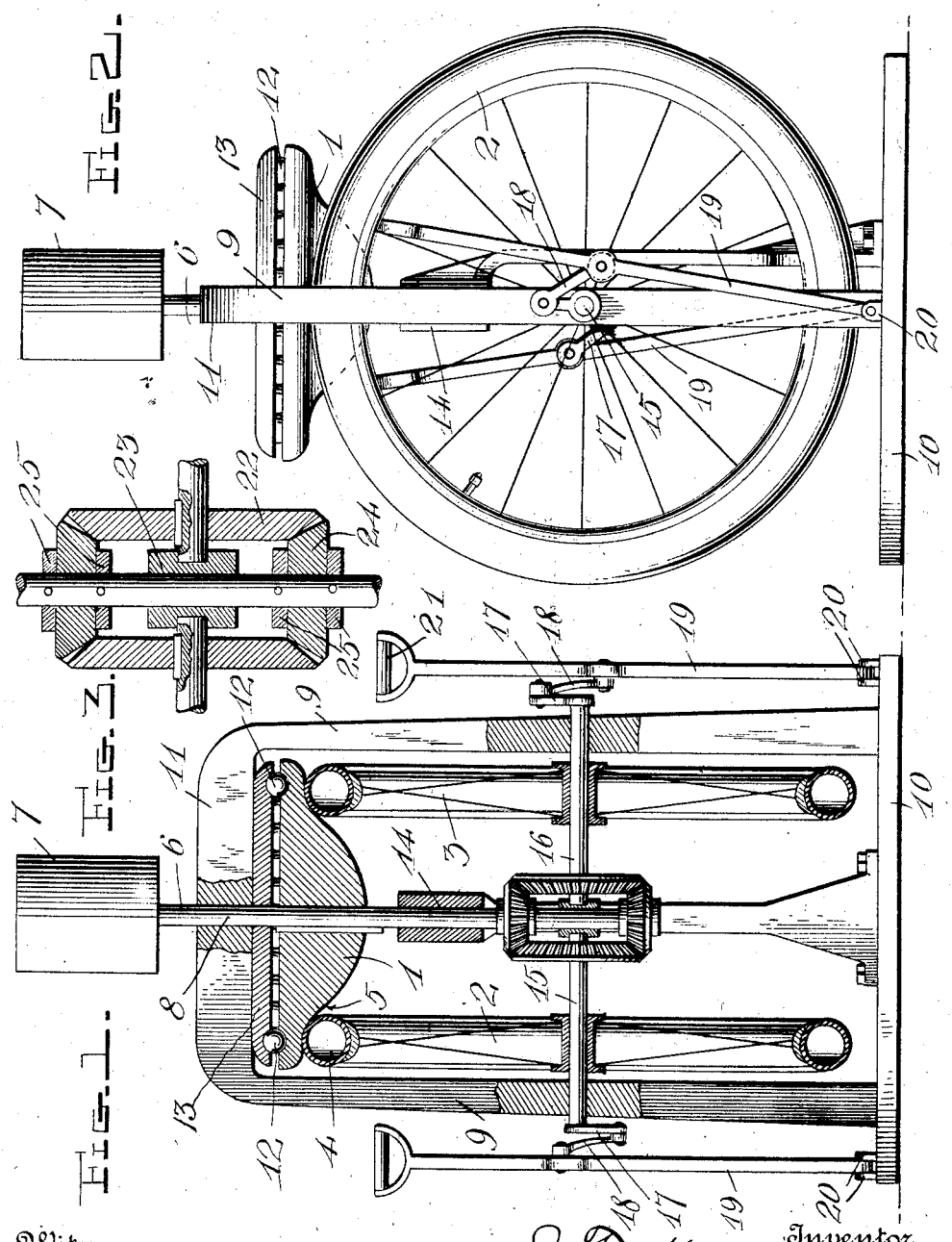

JESS F. HINCK, OF DEVILS LAKE, NORTH DAKOTA, ASSIGNOR OF TWO-THIRDS TO OLUF WM. LARSEN AND JAMES L. LARSEN, OF LAKOTA, NORTH DAKOTA.

FRICTION-GEARING.

No. 854,037.      Specification of Letters Patent.      Patented May 21, 1907.

Application filed February 24, 1906. Serial No. 302,771.

*To all whom it may concern:*

Be it known that I, JESS F. HINCK, a citizen of the United States, residing at Devils Lake, in the county of Ramsey and State of North Dakota, have invented certain new and useful Improvements in Friction-Gearing, of which the following is a specification, reference being had therein to the accompanying drawings.

My invention relates to improvements in friction gearing for cream separators and other machines.

The object of the invention is to provide a mechanism of this character which will be exceedingly light and easy running, and at the same time strong, durable and comparatively inexpensive.

Other objects and advantages of my invention, as well as the structural features by means of which these objects are attained, will be made clear by an examination of the following specification, taken in connection with the accompanying drawings, in which the same reference numerals indicate corresponding parts throughout, and in which:—

Figure 1 is a front elevation, with parts in section, of my improved friction gearing; Fig. 2 is a side elevation of the same; and Fig. 3 is a detail sectional view through the bevel gearing which causes the operating levers to move simultaneously in opposite directions.

The embodiment of my invention shown in the drawings, comprises a cone friction wheel or disk 1 and two friction wheels 2 and 3, which latter have their peripheries cushioned preferably by means of pneumatic rubber tires 4 or the like. These wheels 2 and 3 may be of any suitable form and construction, but I preferably employ wheels similar to the ordinary bicycle wheels. They are disposed at diametrically-opposite points with respect to the cone disk 1 which they drive, and said disk has its friction face 5 curved to receive them, as clearly shown in Fig. 1. The disk 1 is keyed or otherwise secured to a shaft 6 which is here shown as the vertical shaft of a cream separator and which has mounted upon its upper end a separator bowl or receptacle 7 of any desired form and construction. This driven shaft 6 is journaled in a bearing 8 in a suitable frame or support consisting of uprights 9 projecting from a base 10 and connected by a cross-bar 11. To reduce friction and prevent end thrust of the shaft 6, I place an annular row of bearing balls 12 between opposing grooves or raceways formed concentrically in the upper face of the disk 1 and the under face of a circular plate 13 which is disposed beneath the cross-bar 11.

The lower portion of the shaft 6 is mounted in a bearing 14 here shown upon a bracket secured to the base 10. The driving friction wheels 2 and 3 are secured upon alining shafts 15 and 16 which are journaled in bearings in the uprights 9 and have fixed upon their outer ends cranks 17. The latter project in opposite directions and are connected by links or pitman rods 18 to operating levers 19. These levers are disposed upon opposite sides of the machine and have their lower ends pivoted at 20 upon the base 10 and their ends provided with handles 21, so that when they are oscillated simultaneously in opposite directions the wheels 2 and 3 will be rotated in opposite directions to impart their movement to the disk 1 and hence the shaft 6.

In order to cause the levers to move in unison or simultaneously in opposite directions, I key or otherwise secure bevel gears 22 upon the inner ends of the shafts 15 and 16, which ends turn in recesses or seats formed in a bearing block 23 through the center of which the shaft 6 extends and in which it rotates. These opposing gears 22 mesh with upper and lower bevel pinions 24 which turn freely upon the shaft 6 between fixed collars 25 thereon. By means of this construction, it will be seen that one of the gears 22 cannot turn faster than the other, so that the two hand levers must work in unison.

The construction, operation, and advantages of the invention will be readily understood from the foregoing description taken in connection with the accompanying drawings. When the levers are oscillated forwardly and rearwardly in opposite directions at the same time, the wheels 2 and 3 will rotate in opposite directions and impart their movement to the disk 1 by reason of their frictional engagement therewith. Owing to the pneumatic tires upon the wheels 2 and 3 and the shape of the disk 1, the operation of the gearing will be exceedingly light and easy. By inflating the tires 4 to a greater or less extent, the frictional pressure of the wheels 2 and 3 against the disk 1 may be varied as desired. The provision of the bevel gearing between the shafts 15 and 16 is also of great advantage, since it causes the levers to work regularly and enables the one operator to handle the machine with ease.

Having thus described my said invention, what I claim as new and desire to secure by Letters Patent of the United States, is:—

1. The combination, with a driven shaft and two alining drive shafts, of a friction disk upon said driven shaft, drive wheels upon said drive shafts and engaged with said friction disk, and means for rotating said drive shafts simultaneously in opposite directions.

2. The combination with a driven shaft and two alining drive shafts, of a friction disk upon said driven shaft, drive wheels upon said drive shafts to frictionally engage said disk, crank and lever devices for operating said drive shafts, and bevel gearing between said drive shafts for causing them to move simultaneously in opposite directions.

3. The combination, with a driven shaft and two alining drive shafts, of a friction cone disk upon the driven shaft, drive wheels upon said drive shafts to frictionally engage said friction disk, bevel gearing connecting the inner ends of said drive shafts to cause them to turn simultaneously in opposite directions, cranks upon the outer ends of said drive shafts, a pair of operating levers, and links connecting said levers and said cranks.

4. In a machine of the character described, the combination with a frame or support, a driven shaft, and alining drive shafts, of a friction disk upon said driven shaft, an anti-friction device between said disk and said support, friction drive wheels upon said drive shafts having their peripheries engaged with said disk, bevel gears fixed upon the inner ends of said drive shafts, a bevel gear loosely mounted upon said driven shaft and in mesh with the first mentioned gears, cranks upon the outer ends of said drive shafts, operating levers pivotally mounted upon said support, and links connecting said levers and said cranks.

5. In a machine of the character described, the combination with a frame or support, a driven shaft and alining drive shafts, of a friction disk upon said driven shaft, ball bearings between said support and said disk, friction drive wheels upon said drive shafts and engaged with said disk, bevel gears fixed upon the inner ends of said drive shafts, bevel pinions loosely mounted upon said driven shaft and in mesh with said gears, a bearing block loosely mounted upon said driven shaft and having bearing recesses to receive the inner ends of said drive shafts, cranks upon the outer ends of said drive shafts, hand levers pivoted upon said support, and links connecting said levers and said cranks.

In testimony whereof I hereunto affix my signature in presence of two witnesses.

JESS F. HINCK.

Witnesses:
 R. GOER,
 H. H. HAND.